(12) United States Patent
Breuer et al.

(10) Patent No.: US 9,615,304 B2
(45) Date of Patent: Apr. 4, 2017

(54) METHOD FOR INTER-RAT RESELECTION DECISION BASED ON UNBALANCED RADIO CONDITIONS AND DEVICE FOR EXECUTING SAID METHOD

(71) Applicant: GEMALTO M2M GMBH, München (DE)

(72) Inventors: Volker Breuer, Bötzow (DE); Lars Wehmeier, Falkensee (DE)

(73) Assignee: GEMALTO M2M GMBH, Munich (DE)

( * ) Notice: Subject to any disclaimer, the term of this patent is extended or adjusted under 35 U.S.C. 154(b) by 0 days.

(21) Appl. No.: 14/908,011

(22) PCT Filed: Jul. 16, 2014

(86) PCT No.: PCT/EP2014/065220
§ 371 (c)(1),
(2) Date: Jan. 27, 2016

(87) PCT Pub. No.: WO2015/024713
PCT Pub. Date: Feb. 26, 2015

(65) Prior Publication Data
US 2016/0183155 A1 Jun. 23, 2016

(30) Foreign Application Priority Data
Aug. 20, 2013 (EP) .................... 13181075

(51) Int. Cl.
*H04W 36/00* (2009.01)
*H04W 36/30* (2009.01)
(Continued)

(52) U.S. Cl.
CPC .......... *H04W 36/30* (2013.01); *H04W 36/08* (2013.01); *H04W 48/18* (2013.01); *H04W 52/146* (2013.01)

(58) Field of Classification Search
CPC ..... H04W 36/00; H04W 8/245; H04W 60/00; H04W 4/00
(Continued)

(56) References Cited

U.S. PATENT DOCUMENTS

2002/0187784 A1   12/2002   Tigerstedt et al.
2010/0172329 A1   7/2010    Yokoyama et al.
(Continued)

FOREIGN PATENT DOCUMENTS

EP    2 197 236 A1    6/2010

OTHER PUBLICATIONS

International Search Report (PCT/ISA/210) issued on Oct. 16, 2014, by the European Patent Office as the International Searching Authority for International Application No. PCT/EP2014/065220.
(Continued)

*Primary Examiner* — Danh Le
(74) *Attorney, Agent, or Firm* — Buchanan Ingersoll & Rooney PC (57) ABSTRACT

The invention relates to a wireless communication device (UE) configured to be operating in a wireless cellular network supporting a wireless technology standard. For solving the problem of blockage of the UE in regards with one cellular network the UE makes a comparison of communication conditions in downlink and in uplink in order to detect unbalanced communication conditions between downlink and uplink channels and, in case downlink communication conditions are acceptable, but uplink communication conditions show a degradation, initiate an inter-RAT reselection.

14 Claims, 3 Drawing Sheets

(51) Int. Cl.
*H04W 48/18* (2009.01)
*H04W 36/08* (2009.01)
*H04W 52/14* (2009.01)

(58) Field of Classification Search
USPC .................. 455/418, 435.1, 437; 370/331
See application file for complete search history.

(56) References Cited

U.S. PATENT DOCUMENTS

| | | | |
|---|---|---|---|
| 2011/0263255 A1* | 10/2011 | Alonso-Rubio .. | H04W 36/0005 455/436 |
| 2013/0078977 A1* | 3/2013 | Anderson .............. | H04B 1/005 455/418 |
| 2014/0029455 A1* | 1/2014 | Vitthaladevuni ..... | H04W 48/18 370/252 |
| 2014/0092873 A1* | 4/2014 | Hamilton .......... | H04W 36/0094 370/332 |
| 2014/0192659 A1* | 7/2014 | Tian .................. | H04W 72/0453 370/252 |
| 2014/0378152 A1* | 12/2014 | Anand ................ | H04W 72/048 455/452.1 |

OTHER PUBLICATIONS

Written Opinion (PCT/ISA/237) issued on Oct. 16, 2014, by the European Patent Office as the International Searching Authority for International Application No. PCT/EP2014/065220.

3$^{rd}$ Generation Partnership Project; Technical Specification Group Radio Access Network; User Equipment (UE) procedures in idle mode and procedures for cell reselection in connected mode (Release 11), vol. RAN WG2, No. V11.3.0, Jun. 29, 2013, pp. 1-53.

\* cited by examiner

METHOD FOR INTER-RAT RESELECTION DECISION BASED ON UNBALANCED RADIO CONDITIONS AND DEVICE FOR EXECUTING SAID METHOD

FIELD OF THE INVENTION

The invention relates to a wireless communication device (UE) configured to operate in a wireless cellular network supporting a wireless technology standard e.g. GPRS, UMTS or LTE. The problem to be solved is the situation where such wireless communication devices might face service degradation when the connection to the currently operated network node is disturbed. Such network node can be a base station (BS), a nodeB or an eNodeB, or any other network node representing at least a cell of a cellular network.

BACKGROUND OF THE INVENTION

Within the wireless technology standards it is defined, that communication conditions are measured in the UE and in case of being operated in connected mode, UE provides its measurements via network node to the respective wireless cellular network, which then decides about changes of cell (handover) or of technology (inter-RAT handover). In case of being operated in idle mode the UE still makes measurements and makes decisions on its own over reselection and inter-RAT reselection. This defined procedure known from wireless technology standard definition has some drawbacks due to the fact that decisions about a reselection are based on measurements concerning the downlink (DL) channels only.

There is by now no solution known, which solves the problem if uplink (UL) channel conditions are disturbed while downlink channel conditions are within the acceptable range. This leads to the situation that the UE is stuck to a network node representing a cell of the wireless cellular network although the communication conditions are in a situation where no reasonable service provision is possible.

SUMMARY OF THE INVENTION

It is a goal of present invention to solve the addressed problem. For this it is suggested a method for providing seamless communication of a wireless communication device operating within a wireless cellular network according to claim 1. It is further suggested a wireless communication device according to claim 13.

The inventive method comprises the following steps for the wireless communication device (user equipment, UE):
Registering to a cell of the wireless cellular network by communicating with a network node representing at least said cell,
Operating in idle mode
Receiving downlink communication from the network node,
Measuring communication conditions of downlink communication
Deciding based on measurements that downlink communication conditions fulfil predefined downlink threshold values
Monitoring at least one parameter relative to uplink communication conditions,
Deciding based on the at least one monitored parameter that uplink communication conditions do not fulfil predefined uplink threshold values
In such a case initiating an inter-RAT reselection.

According to this method, the UE is first normally operating within the currently selected wireless cellular network. In order to do this, the UE needs to be registered to the network. In order to do this, wireless technology standard compliant methods need to be fulfilled. Such wireless technology standard compliant methods comprise first a synchronisation of the wireless communication unit of the UE, which is in particular a radio frequency unit connected to an antenna, with a network node representing at least one cell of the wireless cellular network. After further steps including exchange of authentication information, the UE is registered to the network. It does not matter if this registration was done right before the following steps of the inventive method or earlier. The following steps can even be performed after the UE was in connected mode, made inter-RAT reselections based on downlink communication conditions, made cell handovers etc.

Typically the UE is then operated in idle mode, that is no active connection or context is set up. As a consequence the UE itself is responsible for maintaining the wireless connection to the wireless cellular network. In order to do so, the UE is repeatedly measuring the downlink communication conditions. As criteria for the downlink communication conditions according to the wireless technology standards there are in particular analysed one or more of CPICH-Ec/Io or CPICH-RSCP (received signal power) in 3G, in 2G RXLEV (reception level) or in 4G RSRQ (reference signal received quality) and RSRP (reference signal received power).

It is mandatory in order to solve the addressed problems to detect an imbalance between the uplink conditions and the downlink conditions. For that the invention proposes a step of monitoring of at least one parameter relative to uplink communication conditions. Based on the at least one monitored parameter it is then decided if uplink communication conditions fulfil predefined uplink threshold values or not. While also monitoring the downlink communication conditions according to the invention, the device is then able to detect an imbalance situation.

In case the uplink communication conditions do not fulfil predefined uplink threshold values while downlink communication conditions are correct, it is decided that an inter-RAT reselection is to be initiated. It means that all the necessary steps of leaving the current cell and network, searching for a new network and camping on a cell of the selected appropriate network need to be executed based on this decision.

There are various ways to detect degraded uplink communication conditions.

In an advantageous embodiment, the step of monitoring at least one parameter relative to uplink communications comprises executing attempts of uplink communication, detecting if the attempts are unsuccessful and after a predetermined number of unsuccessful uplink communication attempts the at least one monitored parameter is set to a value indicating a degradation of uplink communication. Based on the set value of the monitored parameter, the decision is to be made if predefined threshold values for uplink communication are not met, and thus the inter-RAT reselection is initiated. In this embodiment a value of the monitored parameter indicating a certain amount of unsuccessful uplink communication attempts leads to the decision that uplink communication conditions do not fulfil predefined uplink threshold values.

The execution of attempts for uplink communication comprises in particular communication on uplink channels from UE to the network, in particular connection request messages on RACH channel or reporting of downlink traffic load measurements or other reporting towards wireless cellular network, like location area registration area and/or tracking area updates (LAU, RAU and/or TAU).

Attempts are rated as being unsuccessful in case they are not properly responded by the network node resp. the wireless cellular network. In particular, in response to a connection request message, the network node is expected to respond with at least a failure or a confirmation response that can be used for subsequent handling of the requested resources. Failure messages from the network node are designed that way that they can include an error cause for the failure of the uplink communication. This gives an indication of a degradation of uplink communication, and thus can be counted as unsuccessful attempt of uplink communication. If no response at all is received from the network node within a predetermined timeframe, then the attempt is counted as unsuccessful and a counter for unsuccessful attempts is increased. The same applies if a wrong response from the network node is received, which is not expected to be received upon the request. This is an indication for a misread request from the UE to the network node.

Uplink communication conditions do not fulfil predefined uplink threshold values, when the counter for unsuccessful attempts reaches a predetermined threshold. This threshold can advantageously be oriented on other wireless technology standard compliant thresholds indicating continuous degradations like the RLT counter in 2G.

In a further advantageous embodiment, the problem is addressed that on the one hand the counter for unsuccessful attempts can only be increased even when in the meantime the uplink communication conditions are good and no unsuccessful attempts appear, on the other hand that by just one successful attempt the counter for unsuccessful attempts is immediately reset. This is resolved with the inventive method by decreasing the counter for unsuccessful attempts in case of a successful attempt by a predetermined value. The predetermined value can range between 1 and up to the current amount of the counter, which would then again mean a full reduction in case of only one successful attempt.

When the counter for unsuccessful attempts reaches the predefined threshold, the at least one monitored parameter is set to a value indicating a degradation of uplink communication. There are various options what value the parameter is about to represent. One option is to set the monitored parameter to the number of unsuccessful attempts. Another option would be to provide a simple boolean indication that the predefined threshold of unsuccessful attempts has been reached. The latter would relief the reselection decision unit from too much detail of the reasons of uplink communication degradation. In case more than one counter or other values are maintained indicating a degradation of uplink communication, then each of them can be represented in each one monitored parameter or a consolidated monitored parameter indicating the overall status of degradation of the uplink communication is ascertained. With respect to the latter option the same advantages as stated above apply.

In another advantageous embodiment, the step of monitoring at least one parameter relative to uplink communication conditions comprises the detection of change of temperature conditions prior to an attempt of uplink communication. For this the temperature conditions need to be monitored by one or more appropriate temperature sensors, and an increase of temperature, if an uplink communication is envisaged would indicate an expected degradation of uplink communication.

One of the reasons for this situation of temperature conditions change can be an overheating situation on side of the UE. In particular when the UE is about to send data to the network node, a remarkable amount of power is needed, which can lead to an overheating situation. The monitored parameter is then set to a value indicating the change of temperature conditions, e.g. the absolute temperature value, a value showing the amount of increase or a boolean value indicating that the absolute value or the rate of increase or both are higher than a predetermined threshold.

One of the main reasons for a degradation of the uplink communication due to a temperature increase is the known behaviour of UEs in response to a detected temperature increase to perform a transmission of data to the network node with reduced TX power. This reduction can be restricted to a single wireless technology standard or be applied in a broader sense.

Therefore in a further embodiment, the detection of reduction of output power for uplink communication at the UE, in particular the wireless communication unit of the UE, indicates the temperature increase. It explains why the uplink communication is degraded. Indeed the at least one monitored parameter can be set to a value indicating the reduction of output power. For the decision step, if uplink communication conditions fulfil predefined uplink threshold, the indication of a reduction of output power and of current temperature increase is effectively congruent to show an evolution towards degraded uplink communication.

In a further advantageous embodiment, the problem is solved that prior to starting a transmission of a remarkable amount of data the temperature conditions might still be in a calm area, which does not indicate the necessity of a reduction of output power, but during the transmission the temperature increase gets evident. Here the problem occurs that, in connected mode, it is not the UE to decide about technology or cell changes but the wireless cellular network. However this last does not take into account the temperature conditions. Currently, there is moreover no means to inform the wireless cellular network about potential critical conditions. This leads to a massive reduction of output power and at the end of the day in a breakdown of communication or even registration, but not to a change to a wireless technology standard in which the envisaged data transmission could be effected even in the current temperature conditions.

The problem is addressed by the inventive method wherein the step of monitoring at least one parameter relative to uplink communication conditions comprises detection of temperature conditions by way of prediction of a temperature increase during a scheduled service fulfilment. For this the kind of envisaged service, in particular the amount of data to be transmitted, the kind of transmission, e.g. streaming, voice call, packet oriented data upload etc. is taken into account and based on that a value indicating a temperature increase, an expected absolute temperature etc. is calculated prior to the transmission, and the at least one monitored parameter is set to a value indicating one of the predicted temperature increase, in particular the expected temperature or the expected temperature change rate, and/or an expected reduction of output power in response to the predicted temperature increase.

The determined value of the monitored parameter indicating an expected temperature increase and/or an expected reduction of output power leads to the decision that uplink communication conditions do not fulfil predefined uplink threshold values.

The prediction of temperature increase is preferably based on the currently required RACH power in comparison to a power required in the wireless technology of the wireless cellular network the UE is currently operating in for the scheduled service fulfilment. The prediction can in particular be made more accurately after a RACH resp. PRACH power ramping for 3G, which is an increase of transmit power of the PRACH preamble power steps while no response is received from the network node. Once the device receives a positive indication from the network node, the necessary power for a successful payload transmission is known and based on this it can be derived which energy is required for a given amount of data to be uploaded and how the temperature situation will be affected by this. For 2G the indicated uplink power after a RACH exchange can be used.

With this embodiment a wireless cellular network supporting the right wireless technology standard can even be selected a priori, and therefore increase reliability of data transmission by the UE.

Furthermore asymmetric network conditions could also cause situation where the downlink is detectable but the uplink is disturbed due to load or interference conditions which may even be existing on purpose in the uplink direction In another embodiment a degradation of uplink communication can be detected by way of executing uplink communication attempts to the network node where the wireless communication device is currently registered to. Such uplink communication attempts can be executed on one or more channels and/or carriers and can be such connection request messages or reporting messages as stated above. In the event that the network node provides responses to the UE it is still possible that a degradation of the uplink communication affected the communication attempts.

It is known that said responses from network nodes can include information about the received uplink power. By comparing the reported received uplink power with the used power for uplink communication it can be detected that a material reduction of power has happened. If this reduction exceeds a certain predefined threshold then the at least monitored parameter is set to a value indicating degradation or the amount of degradation of the contested carriers and/or channels of uplink communication. Within the decision step this value is considered and therefore it can be determined if uplink communication conditions do not fulfil predefined uplink threshold values.

This embodiment is advantageous compared to above embodiments due to the fact that even when the network node provides an accurate response to an uplink communication attempt it can be detected that uplink communication conditions are already degraded by a lower amount, which on the other hand can be an early indication for an imminent major disruption.

When the step of monitoring at least one parameter relative to uplink communication conditions shows that uplink communication conditions do not fulfil predefined uplink threshold values, it is decided to initiate an inter-RAT reselection. By doing so the addressed problem is only resolved if the targeted wireless cellular network provides better uplink communication conditions. With respect to a monitoring parameter representing temperature conditions or the subsequent reduction of output power it is therefore advantageous to select a network that support a wireless technology standard which can be operated with lower power consumption than the network where the UE is currently operating in.

To facilitate the selection it is advantageous to provide a table of standards and/or networks indicating the power consumption for at least one special reference service operated in this network. By this it is possible to quickly detect if a found network will help. In particular with respect to areas where now at least three major wireless technology standards (GSM, UMTS, LTE) are operated, an appropriate reaction on the network conditions can be selected. The method can further be enhanced by considering further substandards like EDGE, GPRS for 2G, HSPA, CDMA, 1×RTT etc. for 3G and LTE standard/advanced for 4G networks plus a distinction with respect to the used frequency range per wireless technology standard or substandard.

Finally the identified target network is only selected if the downlink communication conditions for the respective wireless technology standard fulfil predefined second downlink threshold values. Due to the fact that, for each wireless technology standard, different network condition parameters are defined, a different set of threshold values per wireless technology standard is maintained. Hence the second downlink threshold values represent a range in which the wireless cellular network is operable. Provided that the target network fulfills the predefined second downlink threshold values, the switch to the target network can then be initiated.

The invention also concerns wireless devices that can represent various classes of devices capable of operating in wireless cellular networks. The inventive wireless communication device comprises a wireless communication unit, a monitoring unit, a communication condition judgement unit and a reselection decision unit. The wireless communication device is characterized in that the wireless network communication unit is configured to:
register to a cell of wireless cellular network by communicating with a network node representing at least said cell
operate in idle mode,
receive downlink communication from the network node,
measure communication conditions of downlink communication;
the monitoring unit is configured to
monitor at least one parameter relative to uplink communication conditions;
the communication condition judgement unit is configured to
decide based on the measurements of wireless network communication unit, if downlink communication conditions fulfil predefined downlink threshold values,
decide based on the at least one monitored parameter that uplink communication conditions do not fulfil predefined uplink threshold values;
further the reselection decision unit is configured to:
initiate an inter-RAT reselection in case communication condition judgement unit decided that downlink communication conditions fulfil predefined downlink threshold values and uplink communication conditions do not fulfil predefined uplink threshold values.

It is of course possible and part of the invention that the single mentioned units the wireless communication device comprises are implemented in units that fulfil a combination of the mentioned units or are software modules operated within one or more central processing units.

In an advantageous embodiment the wireless communication device is further characterized in that on one hand the wireless network communication unit is configured to execute attempts of uplink communication, detect if the attempts are unsuccessful, after a predetermined number of unsuccessful attempts of uplink communication set the at least one monitored parameter to a value indicating a degradation of uplink communication; and on the other hand the communication condition judgement unit is configured to decide based on the monitored parameter that a value indicating a degradation of uplink communication leads to the decision that uplink communication conditions do not fulfil predefined uplink threshold values.

It is arbitrary how the wireless network communication unit detects those unsuccessful attempts of uplink communication. It is advantageous that for detection of an unsuccessful attempt of uplink communication wireless communication device is configured to determine that the network node does not reply properly in response to the uplink communication.

In a further advantageous embodiment wireless communication device further comprises a temperature condition sensor characterized in that the temperature condition sensor is configured to detect a change of temperature conditions, the wireless network communication unit is configured to reduce in response to the detected change of temperature condition the output power of uplink communication and set the at least one monitored parameter to a value indicating the reduction of output power; additionally the communication condition judgement unit is configured to decide based on the monitored parameter that a value indicating a reduction of output power leads to the decision that uplink communication conditions do not fulfil predefined uplink threshold values.

According to another advantageous embodiment wireless communication device is further characterized that the wireless network communication unit is configured to execute attempts of uplink communication to the network node on certain channels and/or carriers, receive response from the network node comprising reporting of received power, compare used power for said uplink communication attempt and reported received power, if the difference of used power for uplink communication and reported received power exceeds a predetermined threshold set the at least one monitored parameter to a value indicating a degradation of certain carriers and/or channels of uplink communication; further the communication condition judgement unit is configured to decide based on the monitored parameter that a value indicating a degradation of uplink communication leads to the decision that uplink communication conditions do not fulfil predefined uplink threshold values.

In a further advantageous embodiment the reselection decision unit is configured to target a second wireless cellular network supporting a wireless technology standard which can be operated with lower power consumption than the wireless cellular network, the wireless communication device is currently operating in, and for which second wireless cellular network communication condition judgement unit decided based on the measurements of wireless network communication unit, if downlink communication conditions fulfils predefined second downlink threshold values.

In an advantageous embodiment, the wireless communication device is a device that includes a module for performing the wireless communication, also known as machine-to-machine (M2M) module or modem. The inventive methods can thus be executed either in the device or in the M2M module or tasks are shared between both. Another type of device can be a device which only integrates baseband chips and fully includes the control of all operations. Such devices can be mobile phones, tablets, PDAs etc.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

In the annexed drawings, FIGS. 1-3 show:

DETAILED DESCRIPTION OF EMBODIMENTS OF THE INVENTION

Figure 1:
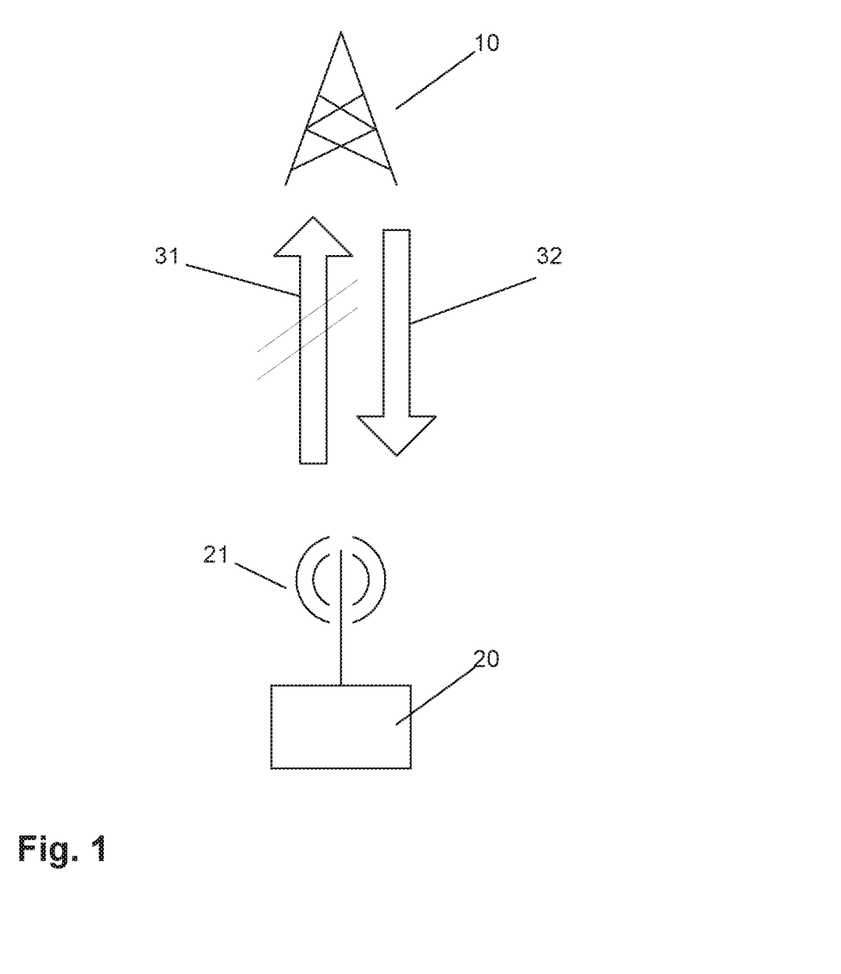
FIG. 1 schematic structure of a wireless communication device in relation to the network node of a wireless cellular network FIG. 2 schematic structure of the inventive wireless communication device FIG. 3 a flow chart showing the general steps of the inventive method

The situation where the invention comes into play is schematically sketched in FIG. 1. Here the relationship of a wireless communication device 20 to a network node 10 of a wireless cellular network (not shown) is shown. It can be seen, that the wireless communication device 20 is via its antenna 21 registered to the wireless cellular network represented by a network node 10 which usually is configured to cover at least one cell.

The wireless communication between the wireless communication device 20 and the network node 10 comprises a couple of channels, here collectively displayed as downlink channels 32 and uplink channels 31. As, according to the invention, the wireless communication device 20 is operated in idle mode, only such channels, which are in use during idle mode are to be considered. E.g. for 3G networks the downlink channels in idle mode are the BCCH, PCCH, and for uplink communication it is the RACH.

The situation described in FIG. 1 shows, as a specific situation, a disturbance on the air interface between wireless communication device 20 and the network node 10, but instead of a common disturbance that affects all channels—e.g. when the wireless communication device 20 moves too far away from the network node 10—in this case only a disturbance of the uplink channels occurs, while the downlink channels are undisturbed and can therefore be operated without limitation. In dependence of the wireless technology standard it is even thinkable that only a subset of the available channels of the uplink channels is disturbed. This would lead to the same result, that the uplink direction of communication between wireless communication device 20 and network node 10 is disturbed.

Figure 2:
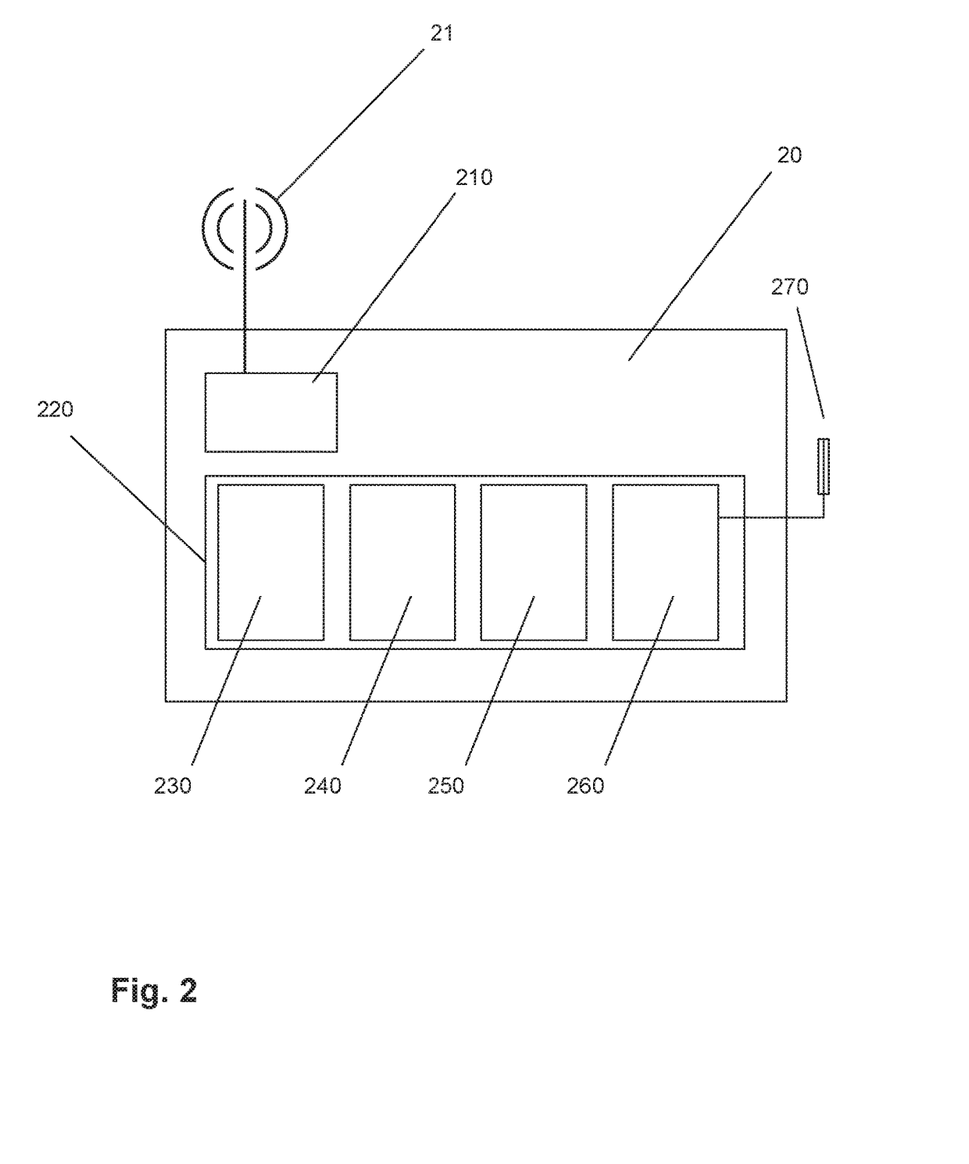

The inventive wireless communication device 20 is in an exemplary embodiment displayed in FIG. 2 and shows one preferred architecture of the device covered by the invention.

The wireless communication device 20 comprises at least an antenna 21 connected to a wireless network communication unit 210. It is arbitrary if the wireless network communication unit 210 is a full-featured M2M module or only the baseband chips including protocol stack for plainly doing the wireless communication. It is further possible to have more than one wireless network communication unit 210 for supporting different wireless technology standards, or at least parts of it are available for each supported technology standard. It nevertheless requires that, with the wireless communication device 20 as such, at least two wireless technology standards are supported.

The additionally available units of the wireless communication device 20 can be singularly available. They can also be implemented within a block or as separate functional blocks of a firmware. Further the units can partly or in total be included in the wireless network communication unit 210, in particular if this is formed by a M2M module.

In the displayed exemplary embodiment, the wireless communication device 20 comprises a control unit 220 which further comprises at least a monitoring unit 230, a communication condition judgement unit 240, a reselection decision unit 250, and a temperature prediction unit 260. Additionally the temperature prediction unit 260 is linked to a temperature condition sensor 270, which is typically formed by a temperature sensor.

Figure 3:
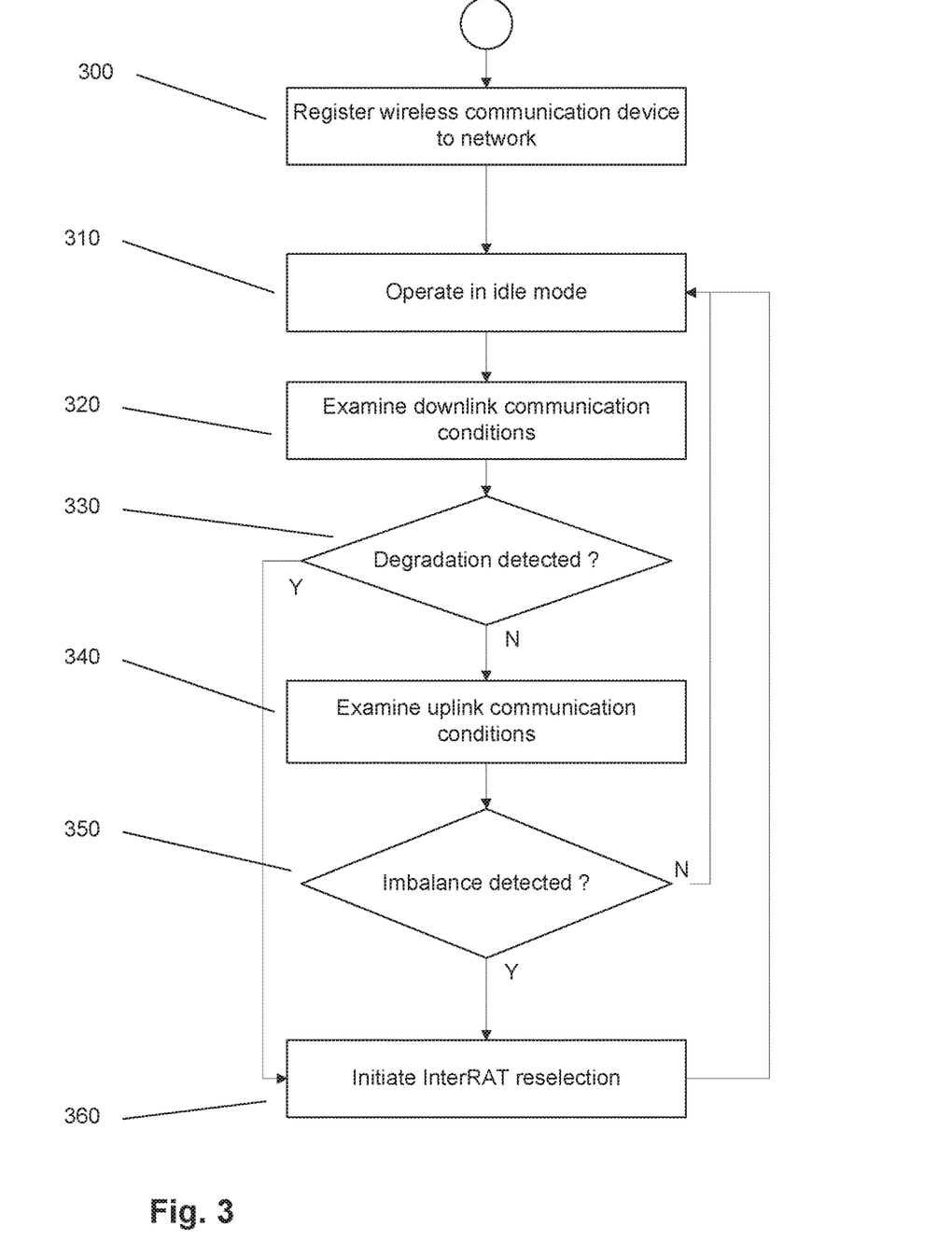

FIG. 3 shows in a flow chart an exemplary procedure according to the inventive method. It starts with the step 300 of registering the wireless communication device 20 in the wireless cellular network, by way of building up a connection to a network node 10, walking through synchronisation and authentication steps (not displayed). The wireless communication device 20 is at the end of step 300 successfully registered to one wireless cellular network supporting a defined wireless technology standard. Between step 300 and step 310 many interactions can happen, including call setup, data connection etc. In step 310 indeed the wireless communication device is operated in idle mode that means no connection is setup and a certain bouquet of uplink and downlink channels available only in idle mode are at hand. These steps are handled by wireless network communication unit 210.

Whenever the wireless communication device 20 is in idle mode, the next steps are to be performed, starting with step 320 where downlink communication conditions are detected. This can consist of listening to common downlink channels, and measuring respective power or deriving corresponding quality. As a result of the measures in step 320, in step 330, it is examined if a degradation of downlink channels can be detected. This is the case if at least one of the measures does not match certain threshold for the particular measurement. These thresholds are usually even dependant of the wireless technology standard of the current wireless cellular network.

If degradation is detected, the procedure jumps down to step 360, but the inventive method focuses on the situation if no degradation is detected in downlink communication. Only in this case the uplink communication conditions are examined in step 340 by the monitoring unit 230. As part of this examination certain embodiments described above are available. For the shown example here the current temperature is measured, in particular by way of getting input from the temperature condition sensor 270. This temperature indicates then a reduction of output power under the condition that now a data transmission be started. Therefore this can lead to the assumptions that uplink communication conditions are degraded.

In step 350 it is now to decide by the communication condition judgement unit 240 if an imbalance between uplink and downlink communication conditions is present. This is then the case if the downlink communication conditions are not disturbed but the uplink communication conditions are disturbed (if downlink communication conditions are disturbed, step 350 will not be reached, this is therefore not a possible scenario).

If no imbalance is detected by the communication condition judgement unit 240, which means uplink communication conditions are undisturbed the procedure jumps again to step 310 and after a certain predetermined time the described steps start anew.

If an imbalance is detected by the communication condition judgment unit 240, this shows that the uplink communication conditions are bad, but the downlink communication conditions are not, and therefore a successful communication within the current wireless cellular network are likely not successfully executed. Thus an inter-RAT reselection is then to be initiated, provided that another wireless cellular network without service degradations is available. This step is preferably executed by the reselection decision unit 260. With regards to a temperature driven uplink communication condition degradation, it is further advantageous if the target wireless cellular network supports a wireless technology standard which requires less output power than the one of the currently used wireless cellular network. For example, a switch from a 3G network to a 2G network can solve the uplink problem and allow the wireless communication device to perform the envisaged data transmission even if the temperature conditions are such that within 3G the data transmission would fail.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. In addition, it is to be understood that the location or arrangement of individual elements within the disclosed embodiment may be modified without departing from the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. A method for providing seamless communication of a wireless communication device operating within a wireless cellular network, the method including the steps for the wireless communication device:

registering to a cell of the wireless cellular network by communicating with a network node representing at least said cell, operating in idle mode, receiving downlink communication from the network node, measuring communication conditions of downlink communication, deciding based on measurement that downlink communication conditions fulfil predefined downlink threshold values, monitoring at least one parameter relative to uplink communication conditions, said step of monitoring including:

executing attempts of uplink communication, detecting if the attempts are unsuccessful, after a predetermined number of unsuccessful attempts of uplink communication, setting the at least one monitored parameter to a value indicating a degradation of uplink communication;

deciding, based on the at least one monitored parameter, that uplink communication conditions do not fulfil predefined uplink threshold values, wherein the step of deciding includes deciding that a value indicating a degradation of uplink communication leads to the decision that uplink communication conditions do not fulfil predefined uplink threshold values, and in such case, initiating an inter-RAT reselection.

2. The method according to claim 1, wherein the wireless communication device is detecting unsuccessful attempts of uplink communication in case said network node does not reply properly in response to the uplink communication, wherein no proper response comprises at least one of:
reception of a failure message from the network node,
no reception of a response at all from the network node within a predetermined timeframe,
reception of a message from the network node, which is not expected to be received upon the request.

3. The method according to claim 1, wherein the step of monitoring of at least one parameter relative to uplink communication conditions comprises detection of change of temperature conditions prior to an attempt of uplink communication, the at least one monitored parameter is set to a value indicating the change of temperature conditions,
and wherein the step of deciding based on the monitored parameter comprises that a value indicating a change of temperature conditions in terms of temperature increase leads to the decision that uplink communication conditions do not fulfil predefined uplink threshold values.

4. The method according to claim 1, wherein the step of monitoring of at least one parameter relative to uplink communication conditions comprises detection of reduction of output power of uplink communication, after a reduction of output power the at least one monitored parameter is set to a value indicating the reduction of output power,
and wherein the step of deciding based on the monitored parameter comprises that a value indicating a reduction of output power leads to the decision that uplink communication conditions do not fulfil predefined uplink threshold values.

5. The method according to claim 1, wherein monitoring of at least one parameter relative to uplink communication conditions comprises detection of temperature conditions by way of a prediction of a temperature increase during a scheduled service fulfilment, and the at least one monitored parameter is set to a value indicating one of:
a predicted temperature increase and/or,
a reduction of output power in response to predicted temperature increase,
and wherein the step of deciding based on the monitored parameter comprises that a value indicating a predicted temperature increase or a reduction of output power leads to the decision that uplink communication conditions do not fulfil predefined uplink threshold values.

6. The method according to claim 5, wherein prediction of temperature increase is based on currently required RACH power in comparison to a power required in the wireless technology of the wireless cellular network the wireless communication device is currently operating in for the scheduled service fulfilment.

7. The method according to claim 1, wherein monitoring of at least one parameter relative to uplink communication conditions comprises executing uplink communication attempts to the network node on certain channels and/or carriers, receiving of response from the network node comprising reporting of received power and comparing used power for said uplink communication attempt and reported received power, the at least one monitored parameter is set to a value indicating a degradation of certain carriers and/or channels of uplink communication if the difference of used power for uplink communication and reported received power exceeds a predetermined threshold,
and wherein the step of deciding based on the monitored parameter comprises that a value indicating a degradation of certain carriers and/or channels leads to the decision that uplink communication conditions do not fulfil predefined uplink threshold values.

8. The method according to claim 1, wherein the inter-RAT cell-reselection is targeting a second wireless cellular network supporting a wireless technology standard which can be operated with lower power consumption than the wireless cellular network, the wireless communication device is currently operating in, and which downlink communication conditions fulfil predefined second downlink threshold values.

9. A wireless communication device, comprising a wireless network communication unit, a monitoring unit, a communication condition judgement unit and a reselection decision unit, wherein the wireless network communication unit is configured to:
register to a cell of wireless cellular network by communicating with a network node representing at least said cell,
operate in idle mode,
receive downlink communication from the network node,
measure communication conditions of downlink communication, the monitoring unit is configured to
monitor at least one parameter relative to uplink communication conditions, including:
execute attempts of uplink communication,
detect if the attempts are unsuccessful, and
after a predetermined number of unsuccessful attempts of uplink communication, set the at least one monitored parameter to a value indicating a degradation of uplink communication,
wherein the communication condition judgement unit is configured to,
decide based on the measurements of wireless network communication unit, if downlink communication conditions fulfil predefined downlink threshold values,
decide, based on the monitored parameter, that a value indicating a degradation of uplink communication leads to the decision that uplink communication conditions do not fulfil predefined uplink threshold values, and
wherein the reselection decision unit is configured to:
initiate an inter-RAT reselection in case communication condition judgement unit decided that downlink communication conditions fulfil predefined downlink threshold values and uplink communication conditions do not fulfil predefined uplink threshold values.

10. The wireless communication device according to claim 9, wherein for detection of an unsuccessful attempt of uplink communication, the wireless communication device is configured to determine that the network node does not reply properly in response to the uplink communication.

11. The wireless communication device according to claim 9, further comprising a temperature condition sensor, wherein
the temperature condition sensor is configured to detect a change of temperature conditions,
the wireless network communication unit is configured to reduce in response to the detected change of temperature condition the output power of uplink communication, and
set the at least one monitored parameter to a value indicating the reduction of output power, the communication condition judgement unit is configured to decide based on the monitored parameter that a value indicating a reduction of output power leads to the decision that uplink communication conditions do not fulfil predefined uplink threshold values.

12. The wireless communication device according to claim 9, further comprising an temperature prediction unit, wherein
the temperature prediction unit (260) is configured to predict a temperature increase during a scheduled service fulfilment, and
set the at least one monitored parameter to a value indicating one of:
a predicted temperature increase, and/or
a reduction of output power in response to predicted temperature increase, the communication condition judgement unit is configured to decide based on the monitored parameter that a value indicating a predicted temperature increase or a reduction of output power leads to the decision that uplink communication conditions do not fulfil predefined uplink threshold values.

13. The wireless communication device according to claim 9, wherein the wireless network communication unit is configured to:
execute attempts of uplink communication to the network node on certain channels and/or carriers,
receive response from the network node comprising reporting of received power
compare used power for said uplink communication attempt and reported received power,
if the difference of used power for uplink communication and reported received power exceeds a predetermined threshold, set the at least one monitored parameter to a value indicating a degradation of certain carriers and/or channels of uplink communication, the communication condition judgement unit is configured to decide based on the monitored parameter that a value indicating a degradation of uplink communication leads to the decision that uplink communication conditions do not fulfil predefined uplink threshold values.

14. The wireless communication device according to claim 9, wherein the reselection decision unit is configured to:
target a second wireless cellular network supporting a wireless technology standard which can be operated with lower power consumption than the wireless cellular network, the wireless communication device is currently operating in, and for which second wireless cellular network the communication condition judgement unit decided based on the measurements of wireless network communication unit, if downlink communication conditions fulfils predefined second downlink threshold values.

* * * * *